March 22, 1932. W. G. HOELSCHER 1,850,302
TRANSMISSION
Filed Jan. 26, 1931 3 Sheets-Sheet 2
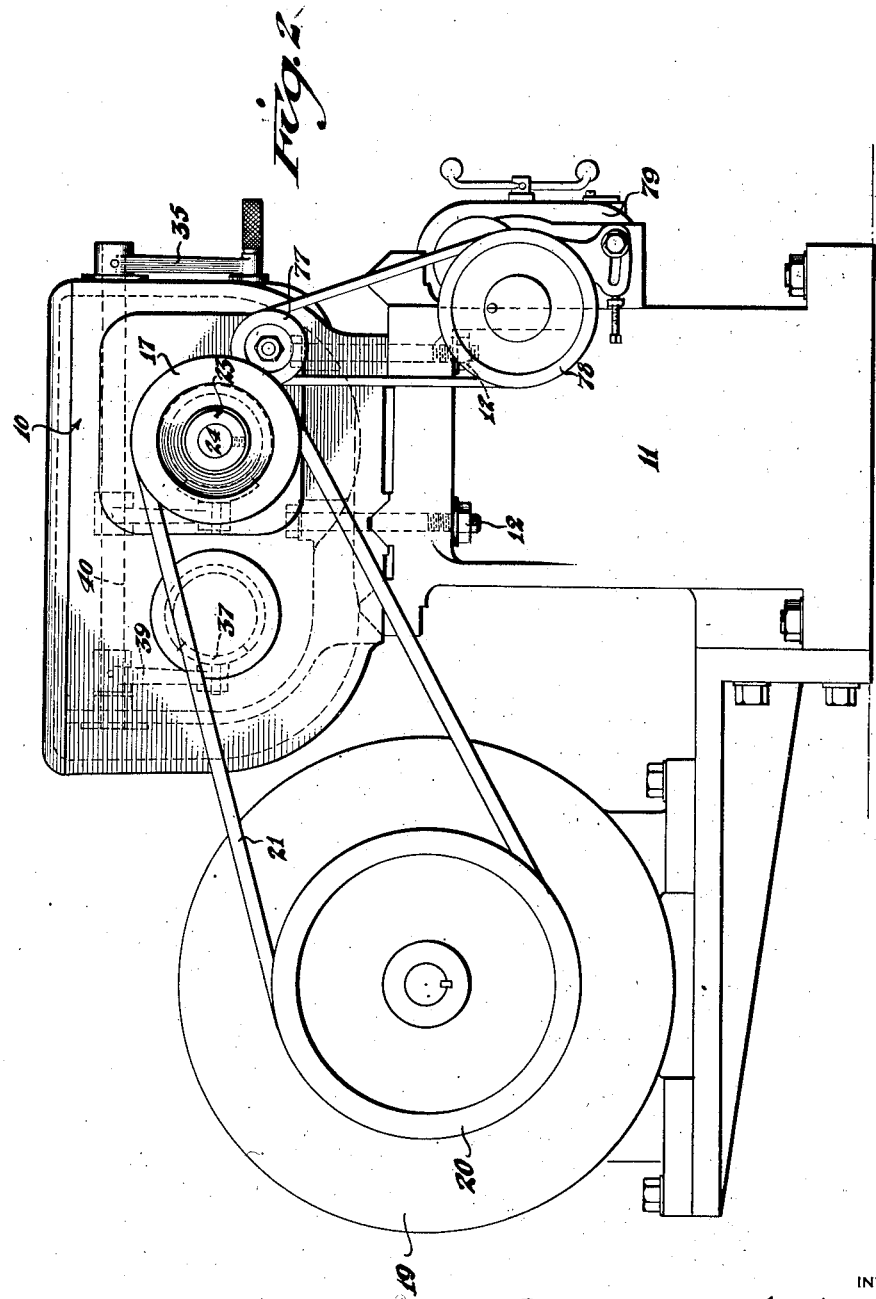

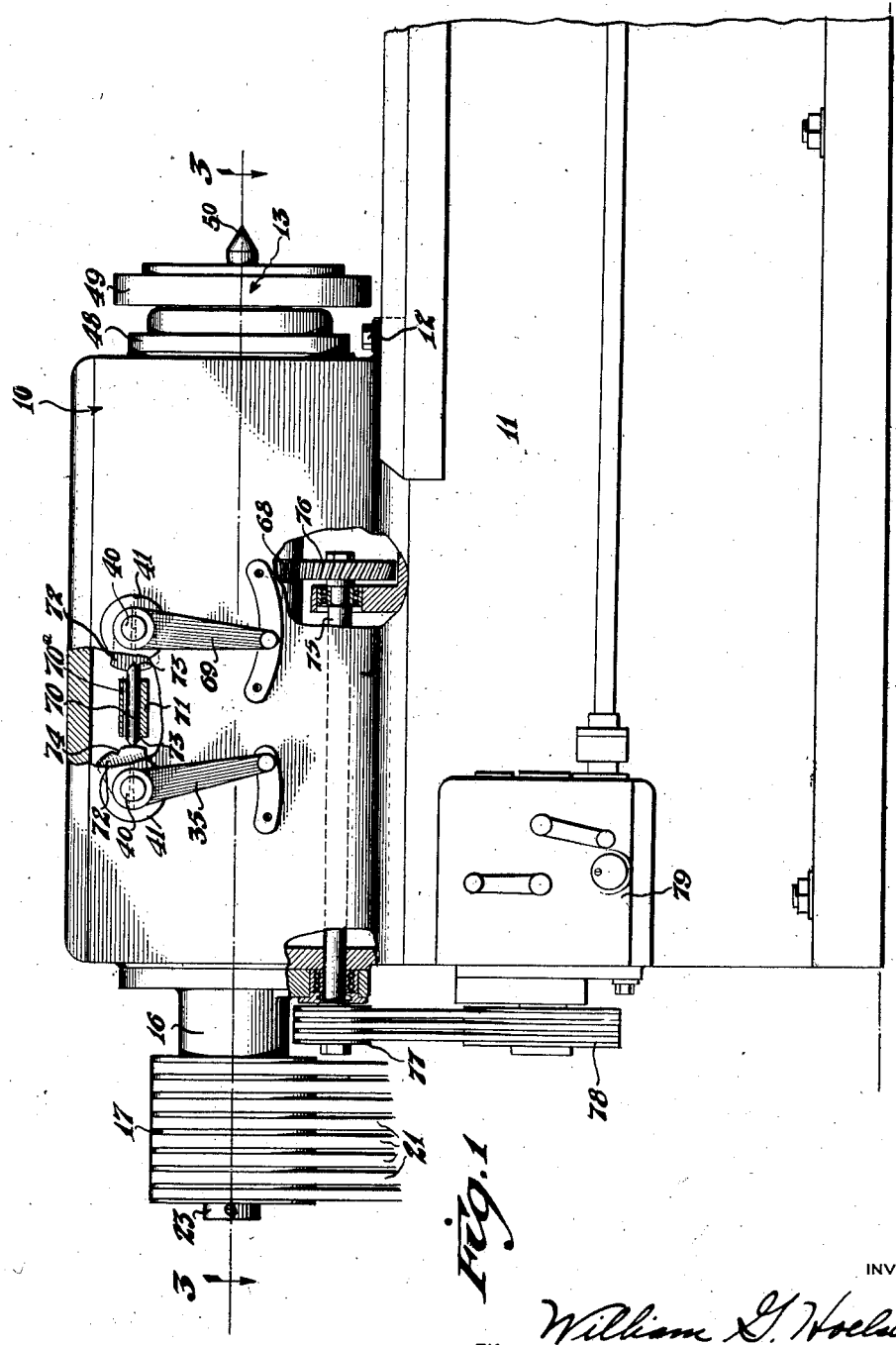

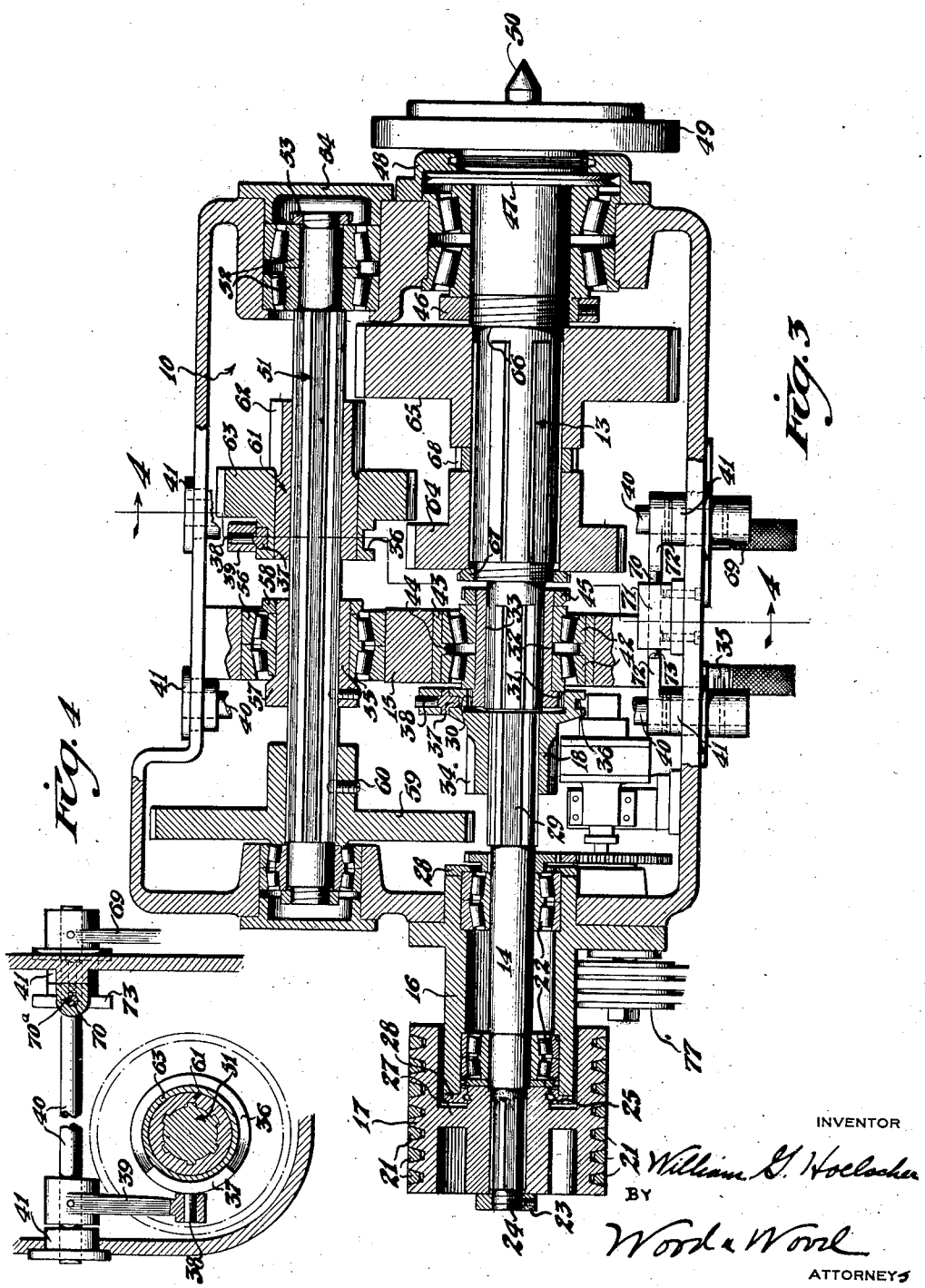

Patented Mar. 22, 1932

1,850,302

UNITED STATES PATENT OFFICE

WILLIAM G. HOELSCHER, OF NORWOOD, OHIO, ASSIGNOR TO THE AMERICAN TOOL WORKS COMPANY, OF CINCINNATI, OHIO, A CORPORATION OF OHIO

TRANSMISSION

Application filed January 23, 1931. Serial No. 511,322.

This invention relates to a transmission and is particularly directed to a power transmission for machines utilizing special cutting tools which permit high speed operation. In view of the modern development of tools wherein extreme hardness and durability are present, a demand has been created for unusually high driving speeds necessitating a design of transmission which will efficiently, safely and directly deliver high speeds up to the maximum under which the tools can operate.

It is, therefore, an object of this invention to provide a power transmission for use in machines utilizing high speed cutting tools which includes the primary feature of efficient high speed power transmission service. This type of transmission is applicable to the headstock of a lathe wherein a considerable range of speed changes is used.

It is a further object of this invention to couple the power motor, for a machine such as a lathe, directly to the spindle thereof for transmitting the motor speeds directly to the spindle without the use of meshing or rolling gear connections of any sort. It is arranged that the variation in speed over a considerable range is derived from the control in the variable speed motor used in connection herewith.

By utilizing a variable speed motor for a direct spindle drive, it is possible to obtain a considerable number of speed changes, without intermeshing gears, by directing coupling the power driven pulley shaft to the spindle. The present invention in addition to this type of drive contemplates in combination therewith a back gearing which may be used for increasing the number of speeds. However, it is to be the primary consideration that the high speeds are accomplished by direct coupling and the added geared speeds are all lower speeds imparted to the spindle when the direct coupling is disconnected.

It is, therefore, another object of this invention to provide gearing connecting the power pulley to the spindle by way of a secondary shaft, in lieu of the direct coupling, for lower rates of speed, these speeds arbitrarily applied within additional ranges by one or a plurality of speed range change gears on the secondary shaft selectively engageable with their respective component gears on the spindle. It will be obvious that for each gear change, the same number of speeds may be delivered from the motor through the back gearing to the spindle as are delivered directly to the spindle and the total or aggregate range of speeds is, therefore, quite extensive.

For the purpose of controlling the direct coupling of the drive to the spindle, a lever is provided conveniently accessible from the exterior of the headstock, this lever accomplishing, beside the direct coupling and uncoupling action, the connection and disconnection of the power to the back gearing or gear transmission extending to the spindle. A pair of speed change gears in the back gearing is likewise shifted by means of a lever, the shift including neutral for both the gears as well as the respective meshing positions with their component gears on the spindle.

For the reason that there are two levers, one effecting direct power coupling to the spindle and the other effecting indirect coupling thereto through a gear train, it is necessary to provide means for preventing mishandling of the levers.

It is, therefore, still another object of the invention to provide an interlock between the levers which prevents connection of the speed change gears with the spindle when the direct coupling is occurring or vice versa.

It is thus arranged that after the direct coupling has been broken by operation of the particular lever, the lever shifting the speed range change gears on the secondary shaft is freed, and the speed range changes may be selectively administered by this latter lever for shifting the speed range change gears.

The primary purpose of the interlock is to prevent any tooth engagement or contact with the spindle through the component gears during direct coupling thereby preventing useless rotation of the back gears which would result in undue wear. Furthermore, the rate of spindle rotation for the higher range of speeds is so extremely high as to render it impractical to have gear connection to the spindle during direct coupling because of the noise and vibration attendant, particularly when there are large gears on the spindle meshing with smaller gears in the back gearing.

Other objects and certain advantages will be more fully apparent from the description of the accompanying drawings, in which:

Figure 1 is a side elevation of the end of a lathe, illustrating an improved headstock, certain portions thereof being broken away for more clearly illustrating the transmission extending from the headstock for the carriage feed.

Figure 2 is an end view of the lathe illustrating the variable speed motor drive in connection with the transmission of the headstock.

Figure 3 is a sectional view taken on line 3—3, Figure 1, detailing the interior of the headstock and fully illustrating the arrangement of the transmission therein.

Figure 4 is a sectional view taken on line 4—4, Figure 3, illustrating the shifting lever for shifting the speed range change gears on the secondary shaft.

The transmission disclosed herein may be used on a variety of machines as a simplified and more efficient form of power transmission for high speed service. It is of particular utility in view of the modern development of high speed cutting tools, such as those formed of tungsten carbide where, because of the hardness of the tool, it is quite possible to speed up the rate of operation of the machine for greater production, this being possible since the tools do not break down under high heat.

Referring to the drawings, a headstock 10 is secured on the ways of a lathe body 11 by means of bolts 12. The lathe illustrated in the drawings is not detailed and is exemplary of any conventional lathe structure.

The headstock casing is designed to support a sectional line of shafting, which line includes the spindle 13 and a section of drive shaft 14 aligned therewith. The inner end of the spindle is journalled in a cross wall 15 of the casing. The drive shaft section is supported for rotation in a journal 16 bolted to the end of the headstock casing and has its inner end extending to a point adjacent the inner supported end of the spindle and its outer end carrying a pulley 17.

Between the adjacent ends of the spindle and drive shaft, a shiftable coupling element 18 is provided. The advantageous direct coupling is accomplished through this element and the adjacent ends of the spindle and drive shaft are rapidly and positively coupled for transmitting the drive direct from the pulley to the spindle without the use of reduction gears of any sort.

A variable speed motor 19 is mounted beside the lathe and has its pulley 20 suitably connected with the pulley 17 on the drive shaft by sectional belting 21. The speed of the motor is controlled through any conventional means for a comprehensive range of motor speed changes, each of which speeds may be directly applied, without reduction, to the spindle.

It will be observed that the belting 21 between the motor pulley 20 and the pulley 17 consists of a plurality of V-type belts of small cross sectional dimension, each operating in a respective groove of the respective pulleys. This type of belting insures a positive drive with less opportunity for slippage and is deemed highly suitable for this type of direct drive wherein extremely high speeds are delivered direct to the spindle and the working load on the motor is consequently heavy.

The journal 16 contains a double roller bearing 22 at each end for supporting the drive shaft. The pulley 17 is secured on a splined end of the shaft 14 by means of a nut 23 on a screw-threaded extremity 24 of the shaft for holding the pulley against a shoulder of the shaft. An oil ring 25 is provided at the outer end of the journal for preventing leakage of oil from the outer bearing. The pulley, which is of considerable width, includes a central flange 27. Its inner hub is short and the journal extends well into the confines of the pulley and the outer bearing is placed well up against the flange of the pulley whereby there is less opportunity for springing of the shaft under the heavy driving forces imparted to the pulley.

The bearings are held in place by caps 28 at each end of the journal. The cap at the outer end of the journal includes an oil groove associated with oil grooves in the hub of the pulley for preventing passage of oil at this point. The inner end of the drive shaft is splined as at 29 and the coupling element 18 is slidably mounted thereon. The coupling element for its purpose includes internal circumferentially arranged teeth 30 at its inner end, these teeth adapted to mesh with the clutch teeth 31 formed on the inner adjacent end of a sleeve 32 journalled in the cross wall of the headstock casing, the sleeve being in splined connection with the inner end of the spindle as at 33. The coupling element also incorporates a gear 34 integrally therewith, the purpose of which will be more fully apparent in the ensuing description.

The coupling element 18 is shifted on its splined support by means of a lever 35 exteriorly accessibly mounted on the headstock casing. The shift connection is as follows: An annular groove 36 is provided in the periphery of the coupling element and an arcuate element 37 is mounted in the groove, the arcuate element having a pin 38 extending radially therefrom. A lever 39 supports and shifts the arcuate element, this lever being pinned on a cross shaft 40 and having the pin 38 of the arcuate element rotatably supported in its lower end. The cross shaft is mounted in journal brackets 41 fixed in the respective side walls of the headstock casing and the operating lever 35 is pinned to an outer extending end thereof. The arcuate element being mounted in the groove permits rotation of the coupling element and when laterally shifted effects the movement of the coupling element from coupled position to retracted position.

The spindle, as will be apparent from the foregoing, is supported at its inner end in the sleeve 32, the sleeve being rotatably journalled in a pair of bearings 42 mounted in spaced relation in a fixed sleeve 43 secured in the cross wall, the fixed sleeve having an intermediate shoulder 44 for spacing the bearings. The sleeve 32 is maintained against axial displacement and fixed to the inner races of the bearing by means of a nut 45 screwed onto the end of the sleeve opposite to the gear.

The outer end of the spindle is supported in a pair of bearings which are mounted in spaced relation in the wall of the headstock. The spindle is held against axial displacement relative to its journal by means of a nut 46 screwed onto a large diameter portion of the same and abutting the inner race of the inner bearing, the inner race of the outer bearing being engaged by an oil ring 47 and the oil ring being engaged by a shoulder of the spindle whereby tightening of the nut binds the spindle to the inner races of the bearings.

A cover plate 48 is mounted over the oil ring and includes appropriate grooves associated with grooves of the spindle for sealing the end of the spindle against leakage of oil. The conventional face plate 49 and work point 50 are mounted on the spindle end.

The direct coupling is used for the higher range of speeds, which range may include all the possible changes obtainable in the variable speed motor. The rate of rotation is unchanged from the drive shaft pulley to the spindle, due to the direct coupling.

For the lower ranges of speed, a back gearing or reduction gearing is provided. For this purpose a secondary or counter-shaft 51 is journalled in the end walls and cross wall of the headstock at one side of the direct drive line of shafting. The shaft is splined throughout its length with the exception of its ends at the journalled portions thereof. It is loosely rotatively journalled by the following arrangement which is identical for both ends.

A double roller bearing 52 is provided supporting a plain round portion of the shaft, the inner element of the bearing abutting the shoulder between the plain portion and the splined portion and held tightly thereagainst by means of a nut 53 on the screw-threaded extreme end of the shaft. A cover plate or cap 54 closes the end of the bore housing the bearing.

The intermediate bearing of this shaft on the cross wall is within a sleeve 55 in splined connection with the shaft, the sleeve being journalled in the wall in a double roller bearing 56 and maintained against axial displacement by virtue of its headed end 57 held against one end of the roller bearing inner race and a nut 58 screw-threaded on the sleeve engaging the opposite end of the inner race of the bearing.

The drive is initially imparted to this splined shaft from the main shaft through the gear 34 formed on the coupling element meshing, when in retracted position, with a large gear 59 fixed to the secondary shaft by means of a set screw 60. The act of uncoupling the direct drive connects the main drive shaft with the secondary shaft. For connecting the secondary shaft with the spindle, two sets of component speed range change gears are included providing two additional speed ranges which are below the speed range of direct drive. For this purpose a gear cluster 61 is slidably mounted on the secondary countershaft, including two gears 62, 63 which may be integrally or separately formed.

The component gears 64, 65 for these gears 62, 63 are mounted on the spindle on a splined portion thereof, and are maintained against axial displacement by engagement against a shoulder 66 of the spindle maintained by a nut 67 screw-threaded on the spindle and engaging the side of the assembled component gears opposite to that engaged against the shoulder. A carriage feed driving gear 68 is included between the component gears 64, 65 mentioned.

The shifting means for moving the shiftable cluster is identical to that described for moving the coupling means with the exception that the particular lever 69 for this purpose is moved to three positions for including an intermediate or neutral.

It is desirable from the standpoint of preventing useless or back rotation of the back gears 62, 63 by the spindle gears 64, 65 and clashing of gears due to meshing of moving gears to provide a means for preventing shifting of the control lever 69 for the lower speed ranges when direct coupling is effective. For this purpose a shuttle pin 70 is slidably mounted in a block 71 attached to the inner side of the casing wall adjacent the shift levers and is held against rotation by means of a key 70ᵃ.

A segmental plate 72 is mounted on each cross rod 40, 40, the curved surface of the plate adapted to engage the respective ends of the shuttle pin. The shuttle pin includes tapered ends 73 adaptable for engagement in a V-shaped notch 74 in the respective surfaces of the segmental plates. The shuttle pin is longer by the depth of a notch 74 than the distance between the adjacent curved surfaces of the segmental plate.

Referring to Figure 1, the arrangement of the grooves relative to each other and the pin 70 will be apparent. When the coupling element has been shifted into coupled position and the groove of its segment is above the shuttle pin, the shuttle pin has been moved across into the groove 74 into the segmental plate on the lever 40 for shifting the gear cluster. This latter lever 69 must be in neutral position to permit direct coupling since the groove is aligned this time only.

If the gear shifting lever is in either position of gear mesh for the respective speed range changes, its groove will be disaligned and the pin because of its length will naturally have to be engaged in the groove of the segmental plate on the direct coupling shaft 40 at which time the direct coupling element 18 will have to be in retracted or uncoupled position with its gear 34 connected to the back gearing. It will be appreciated that clashing of gears would result if the gear cluster 61 were in either one of its positions of drive when the direct coupling lever were suddenly moved from coupled to uncoupled position connecting the main drive shaft with the back gearing. The large gear would be rotating at the time and the clashing would occur between it and the gear on the coupling element. Furthermore, the small gears of the cluster would be driven uselessly by the large gears on the spindle, (if the above situation were true), at an extremely high rate of speed, so high as to be impractical because of the vibration and noise. The interlock prevents this condition.

Also, assuming the gear of the coupling element to be meshed with the large gear 59 and the cluster to be meshed with a particular gear on the spindle, a clashing would result if the coupling element were suddenly shifted to direct coupling position since the coupling connection would be to a loosely rotating sleeve on the spindle.

The carriage feed drive is taken from the spindle directly through the gear 68 and is accomplished through a shaft 75 mounted in the headstock and having a gear 76 in mesh with the gear 68 on the spindle and carrying a small pulley 77 at its outwardly extended end, this pulley being connected to a pulley 78 driving the carriage feed transmission in the box 79 mounted on the lathe body.

Having described my invention, I claim:

1. In a transmission, a support, a variable speed motor, a drive shaft mounted in said support and driven by said motor, a shaft to be driven mounted in said support, a back gearing between the drive shaft and the shaft to be driven for imparting lower ranges of speed to the shaft to be driven, a coupling element for connecting said drive shaft directly to the driven shaft or said drive shaft to said back gearing, said back bearing including a shiftable small gear and a large gear mounted on the shaft to be driven, a lever for moving the coupling element from direct coupling position to back gearing connection position, a lever for shifting the shiftable small gear into mesh with the large gear, and an interlock between said levers for preventing the operation of one when the other is effective for connecting the drive shaft to the shaft to be driven.

2. In a transmission, a variable speed motor, a drive shaft driven by said motor, a shaft to be driven by said drive shaft, a back gearing between the drive shaft and the shaft to be driven for imparting reduced ranges of speed to the shaft to be driven, a coupling element for alternately directly connecting said drive shaft to said driven shaft and said drive shaft to said back gearing, a lever for shifting said coupling element between direct coupling position and back gearing connection position, a lever for connecting the back gearing to the shaft to be driven, segmental elements carried by the respective levers and having their curved faces adjacently disposed, said curved faces including grooves, and a slidably mounted shuttle pin disposed between the curved surfaces and of a length equal to the distance between the elements plus the depth of a groove, said grooves arranged to permit shifting of the shuttle pin to alternate sides for permitting movement of the lever and segmental element controlling the movement of the coupling element when the lever and segmental element controlling the connection of the back gearing to the shaft to be driven is in neutral position.

In witness whereof, I hereunto subscribe my name.

WILLIAM G. HOELSCHER.